(12) United States Patent
Looney

(10) Patent No.: US 6,366,876 B1
(45) Date of Patent: *Apr. 2, 2002

(54) METHOD AND APPARATUS FOR ASSESSING COMPATIBILITY BETWEEN PLATFORMS AND APPLICATIONS

(75) Inventor: Kevin T. Looney, Sunnyvale, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,756

(22) Filed: Sep. 29, 1997

(51) Int. Cl.[7] ............................................. G06F 9/445
(52) U.S. Cl. ............................. 703/25; 703/26; 707/10; 717/11; 713/1
(58) Field of Search .................... 395/500, 600, 395/680, 200.5, 712, 653, 654; 711/2, 100; 703/25, 26, 27; 707/3, 10; 717/17, 11; 713/1

(56) References Cited

U.S. PATENT DOCUMENTS

| | | | | |
|---|---|---|---|---|
| 5,404,529 A | * | 4/1995 | Chernikoff et al. ......... 395/700 |
| 5,418,953 A | * | 5/1995 | Hunt et al. ................. 395/650 |
| 5,491,694 A | * | 2/1996 | Oliver et al. .............. 370/55.4 |
| 5,548,759 A | * | 8/1996 | Lipe ............................ 395/600 |
| 5,583,983 A | * | 12/1996 | Schmitter ................... 395/703 |
| 5,678,039 A | * | 10/1997 | Hinks et al. ................ 395/604 |
| 5,757,925 A | * | 5/1998 | Faybishenko ................ 380/49 |
| 5,787,246 A | * | 7/1998 | Lichtman et al. ......... 395/200.5 |
| 5,793,979 A | * | 8/1998 | Lichtman et al. ....... 395/200.56 |
| 5,809,329 A | * | 9/1998 | Lichtman et al. ........... 395/828 |
| 5,815,415 A | * | 9/1998 | Bentley et al. ............. 364/578 |
| 5,819,107 A | * | 10/1998 | Lichtman et al. ........... 395/828 |
| 5,835,777 A | * | 11/1998 | Staelin ........................ 395/712 |
| 5,905,860 A | * | 5/1999 | Olsen et al. ........... 395/187.01 |
| 5,909,545 A | * | 6/1999 | Frese, II et al. ......... 395/200.38 |
| 5,954,826 A | * | 9/1999 | Herman et al. ............... 714/46 |
| 5,999,730 A | * | 12/1999 | Lewis et al. ................. 395/702 |
| 6,038,677 A | * | 3/2000 | Lawlor et al. ................. 714/4 |
| 6,047,312 A | * | 4/2000 | Brooks et al. .............. 709/203 |
| 6,108,800 A | * | 8/2000 | Asawa ......................... 714/47 |

FOREIGN PATENT DOCUMENTS

EP          0860773          8/1998

OTHER PUBLICATIONS

Baratta–Perez G. et al: "ADA System Dependency Analyzer Tool" Computer, vol. 27, No. 2, Feb. 1, 1994, pp. 49–55.
Perry D E: "The Inscape Environment" May 16, 1989, Proceedings of the International Conference on Software Engineering, Pittsburgh, May 16–18, 1989, IEEE, pp. 2–12.

* cited by examiner

Primary Examiner—Kevin J. Teska
Assistant Examiner—Thai Phan
(74) Attorney, Agent, or Firm—The Hecker Law Group

(57) ABSTRACT

Embodiments of the invention can be used to assess whether a software application is compatible with an operating platform. A specification that describes the operating platform is generated using a definitional language. The specification identifies the programming resources of an operating platform. The application's dependencies and programming resources are identified. A compatibility engine is executed to resolve an application's dependencies to the specification. The output of the compatibility engine identifies whether the application conforms to the operating platform and how it deviates from the specification.

37 Claims, 14 Drawing Sheets

```
502 - <specfile name=Foo version=1.0>
504 -   <package name=PackageA status=required>
506 -     <package name=PackageSubA status=optional>
508 -     </package>
510 -   </package>
512 -   <package name=PackageB status=required>
514 -     <package name=PackageSubB status=optional>
516 -       <class name=classE status=modified>
518 -       </class>
520 -     </package>
522 -   </package>
524 - </specfile>
```

METHOD AND APPARATUS FOR ASSESSING COMPATIBILITY BETWEEN PLATFORMS AND APPLICATIONS

BACKGROUND OF THE INVENTION

1. Field of the Invention

This invention relates to computer systems, and specifically to compatibility issues between platforms and the applications intended to run on them.

2. Background Art

Computer software developers are creating software applications and programs for non-traditional environments. Instead of only creating programs for desktop computers or laptop computers, developers are also creating programs for other systems that may have "embedded processors" to add or enhance functionality. Such devices include cellular phones, personal digital assistants, smart cards, pagers, and other devices. An environment in which a software application will be used is referred to here as a "platform".

In developing software applications for new and emerging platforms, it is important to be able to test and analyze the software for compliance with these platforms. This allows the developer to determine if the software is compatible with the platform. Debugging software can be used to provide some analytical capability at run time, but does not provide flexibility for new or changing platforms. Linkers and other build tools link code. That is, build tools create executable code from object code and warn, at build time, when references are unresolved. A build tool is limited in scope to the object code that it is linking. It does not verify or assess the code's compliance with a platform.

With the popularity of network systems, such as the World Wide Web, there is a need to provide more compatibility of computer and non-computer platforms to the Web. The Java™ language developed by Sun JavaSoft™ has provided a way to write platform independent applications to run on the Web and provide the desired compatibility. Some platforms may have unique and/or proprietary interfaces, limited memory and display sizes, constrained power consumption, user response time, and limited physical space. These platform are referred to here as restrictive environments. A version of Java™ called PersonalJava™ has been developed by JavaSoft to be used with, among other things, restrictive environments. A description of Java and PersonalJava can be found at web site "http://www.java.sun.com".

When writing applications for devices, whether using Java, PersonalJava, or any other language, it is important to be able to analyze the applications for compatibility with the intended device. Debugging programs have been used in the past to provide some analysis capabilities. However, with the number of different environments of portable devices, the number of debugging programs required becomes unweildy. It would be desirable to have a general solution to the problem of analyzing the compatibility of applications with the device environment for which they are written.

SUMMARY OF THE INVENTION

Embodiments of the invention can be used to assess whether a software application is compatible with an operating platform. A specification that describes the operating platform is described by a definitional language. The specification identifies the programming resources of an operating platform The application's dependencies and programming resources are identified. A programming resource is data and functionality that is accessible to an application (e.g., in a Java application environment, a programming resource includes methods, classes and packages). A compatibility engine is executed to resolve an application's dependencies are resolved to the specification. The output of the compatibility engine identifies whether the application conforms to the operating platform and how it deviates from the specification.

A grammar is used to specify programming resources of the operating platform that may be used to resolve an application's references. At least one specification is created that defines the programming resources of the operating platform. Where more than one specification is defined, the specifications are merged to create a combined definition of the operating platform. The application's program files are parsed to identify references that must be resolved before the application can execute, The application's programming resources are identified as well.

An attempt is made to resolve references within the application. However, the application may contain external references that cannot be resolved within the application. If neither the application nor the operating platform contains a programming resource that can resolve a reference, the reference is unresolvable.

If a reference cannot be resolved within the application, the merged specification is examined to determine whether the operating platform contains a programming resource that can be used to resolve the reference. If the programming resource is found, a compliance status associated with the programming resource is examined to determine whether it is available for use by the application. If the programming resource has a compliance status of "required," the operating platform is required to include the programming resource and the application's reference is reported as resolved. An "optional" compliance status indicates that the entry may or may not be included in the operating platform. If the optional status is not overridden by a subsequently-processed specification, the reference is reported in error (e.g., the reference is to an unimplemented optional programming resource). A "modified" compliance status indicates that the programming resource associated with the entry has been changed. An "unsupported" compliance status indicates that the application's reference is not supported by the operating platform. A status of "optional," "modified" or "unsupported" resolves the reference, but indicates a potential problem with that reference.

Either a warning or an error message is generated for those references that are not resolved to the application programming resource or a "required" specification programming resource. A "non-conformance" warning is generated for those references that resolve to a "modified" specification programming resource, or for a reference that does not resolve to a programming resource (i.e., an "unresolved" status). A reference that resolves to an "unsupported" or "optional" specification programming resource causes a "non-conformance" error.

In one embodiment of the invention, the operating platform includes a Java™ application environment. The programming resources that can be used to resolve a reference include a package, class or method. The class files that comprise the application are parsed to identify its references (e.g., fields, return types and method arguments). An application dependency tree is created that identifies the application's references.

An attempt is made to resolve references in each of the application's class files. After all of the references have been processed, an assessment as to the application's conformity to an operating platform and an identification as to how the application deviates is provided. This feedback can be used to determine changes that can be made to the application, the operating platform or both that would result in conformity between the application and its operating platform.

DETAILED DESCRIPTION OF THE INVENTION

A method and apparatus for assessing compatibility between platforms and applications is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
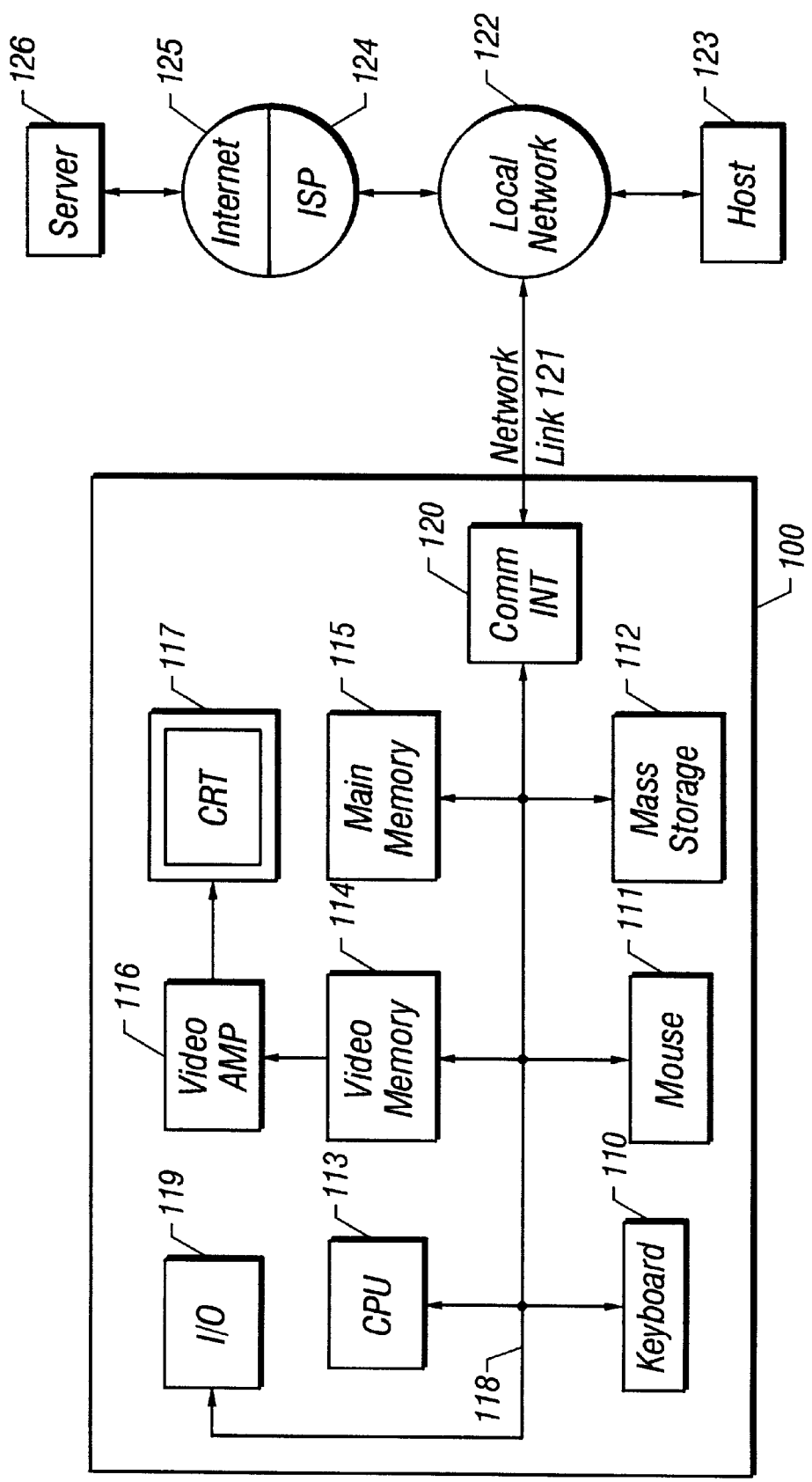
FIG. 1 is a block diagram of an embodiment of a computer system capable of providing a suitable execution environment for an embodiment of the invention.

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the Method and Apparatus for Identifying Compatibility Between Hardware and Software Platforms described herein.

The received code may be executed by CPU 113 as it is received, and/or stored in mass storage 112, or other non-volatile storage for later execution. In this manner, computer 100 may obtain application code in the form of a carrier wave.

The computer system described above is for purposes of example only. An embodiment of the invention may be implemented in any type of computer system or programming or processing environment.

Operating Platform

Figure 2:
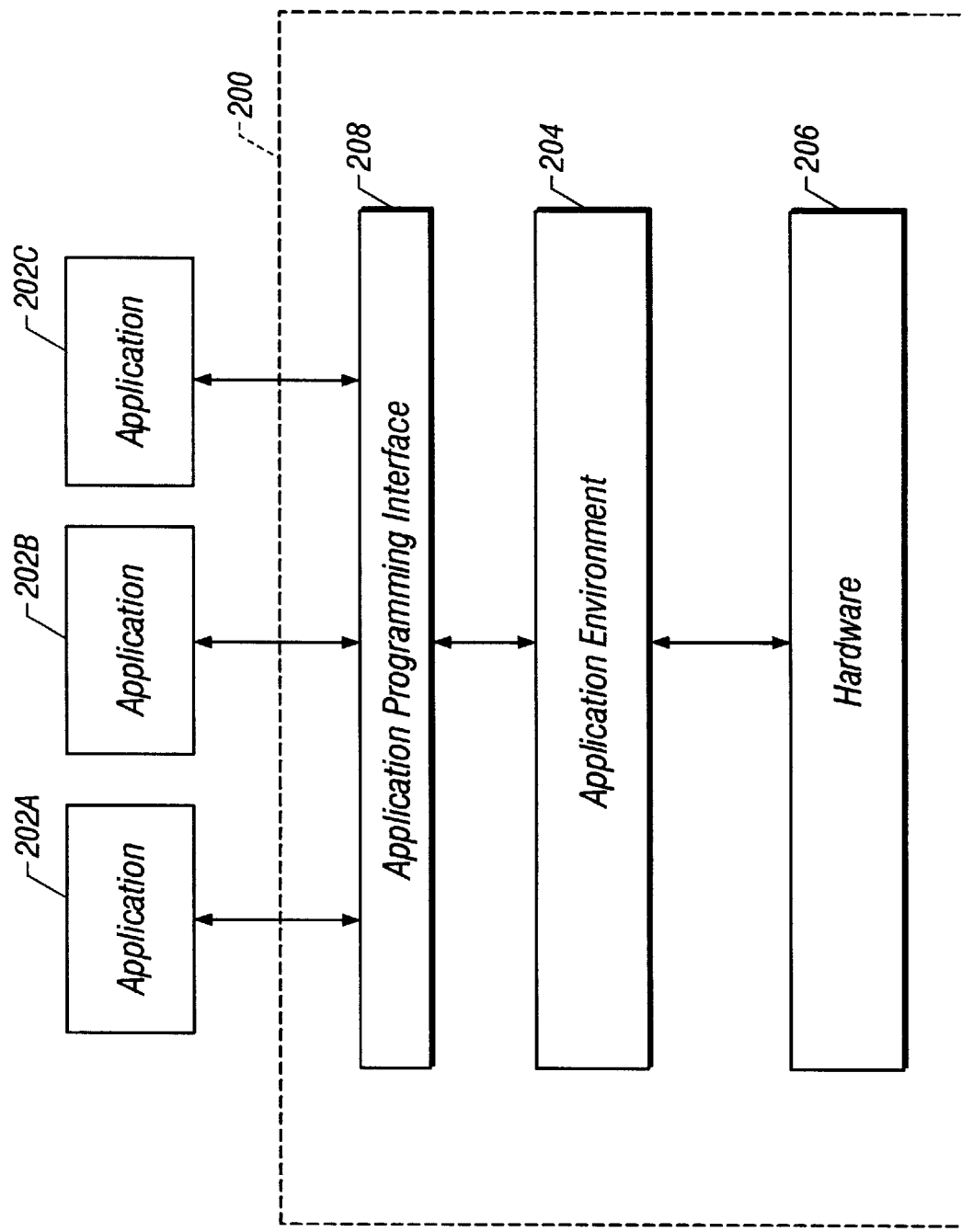
FIG. 2 illustrates the interaction between the application and its operating platform according to one embodiment of the invention.

An operating platform provides an environment in which an application executes. The operating platform may be a cellular phone, personal digital assistant, smart card, or any other environment. FIG. 2 illustrates the interaction between the application and its operating platform according to one embodiment of the invention.

Applications 202A–204C are comprised of program code that is designed to perform some function. The program code of applications 202A–202C can be written in a programming language such as Java™, Objective C/ C++, assembly, or other languages. Applications 202A–204C execute on operating platform 200 that is comprised of application environment 204, hardware 206 and application environment API 208. Hardware 206 includes a central processing unit and a storage component such as memory (e.g., random access memory or read-only memory).

Hardware 206 can be computer 100, for example. Alternatively, hardware 206 can be a processor including a central processing unit and memory (e.g., random access memory and read-only memory) that is embedded in a host device (e.g., smart card, cellular phone, pager, etc.). The embedded processor can be programmed to provide functionality in the host device. For example, hardware 206 can be an embedded processor installed in a mobile phone that is configured using program code executed in the embedded processor to store and retrieve phone numbers. Most video cassette recorders (VCRs) include an embedded processor that executes program code to offer a variety of operations to the user (e.g., set the time and date, preset a timed recording of a television program, etc.).

Hardware 206 is configured to execute a set of general purpose instructions or operations referred to as a hardware instruction set. Operations that are included in the hardware instruction set include arithmetic, logical, test, branch and move operations. For example, when a move operation is given to the central processing unit of hardware 206, the data that is stored at a first memory address is moved to a second memory address.

Application environment 204 provides an interface between applications 202A–202C and hardware 206. Applications 202A–202C access application environment 204 via an application environment application programming interface (API) 208. Application environment API 208 identifies programming resources available in operating platform 200 including methods, functions, classes, or libraries provided by application environment 204.

Application environment 204 has an operating system that interacts with and manages the resources of hardware 206. For example, operating systems can include device handlers (e.g., input/output, or I/O controllers), memory managers, language processors (e.g., compiler or interpreter), process schedulers, debuggers, file managers, or other components.

An operating system's memory and file managers can be used by applications 202A–202C to access temporary and permanent storage, respectively. A device handler acts as an interface between a peripheral device such as printer. In addition, a device handler can be used to interface between permanent storage and the hardware's CPU. Applications 202A–202C are typically written using a software instruction set that is translated into the hardware instruction set by a language processor before being executed by hardware 206. The output of a language processor is referred to as executable code.

Application environment 204 can further provide libraries that have functions used by applications 202A–202C to perform a particular task, Applications 202A–202C include references or links to the library routines. For example, an I/O library contains functions that allow an application to communicate with an I/O device (e.g., a routine to retrieve keyboard input, or output to a display or printer).

For applications 202A–202C to function correctly, the library routines that they intend to use must be available in application environment 204. If, for example, application 202B requires a routine contained in an I/O library that is not available in application environment 204, the program will not include the functionality of the routine. Application 202B will not successfully execute without the referenced routine. Thus, if application environment 204 does not contain the needed libraries, applications 202A–202C cannot execute in operating platform 200.

Further, if application environment 204 does not have a language processor that can translate the software instructions of applications 202A–202C into the hardware instruction set of hardware 206, applications 202A–202C cannot be executed in operating platform 200.

In one embodiment of the invention, application environment 204 includes a virtual machine that has its own instruction set. An example of a virtual machine is Java Virtual Machine from JavaSoft, a Sun Microsystems, Inc. Business, located in Mountain View, Calif. In the Java Virtual Machine, instructions in the VM instruction set are referred to as bytecodes. Each bytecode consists of a instruction name (called an operation code, or opcode) and a set of parameters, or operands. There are approximately 220 bytecodes that perform operations such as loading variables, branching, arithmetic operations, stack manipulation, etc.

A language processor is used to translate the software instructions contained in applications 202A–202C into instructions from the virtual machine's instruction set (or the VM instruction set). A Java compiler is used, for example, to translate software instructions into Java bytecode instructions.

The virtual machine includes a translator that converts the VM instructions in the translated (or compiled) versions of applications 202A–202C into instructions in the hardware instruction set. For example, a Java Interpreter or Java Just-in-Time JIT) Compiler can be used to translate the VM instructions into hardware instructions. The Java Interpreter performs the translation as the application is being executed. As an application is executing, the Java Interpreter performs a table lookup to determine which instruction or instructions in the hardware set need to be performed to execute the current VM instruction. The Java JIT compiler translates the application's VM instructions into hardware instructions before the application begins execution.

Object-Oriented Programming Languages

In one or more embodiments of the invention, program code such as program libraries of application environment 204 as well as applications 202A–202C are written in an object-oriented programming language such as Java.

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

Object-oriented programming languages are predominantly based on a "class" scheme. A class provides a definition for an object that typically includes both instance variables and methods. An object class is used to create a particular instance of an object. An instance of an object class includes the variables and methods defined for the class. Multiple instances of a the same class can created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

In addition to the class hierarchy, some object-oriented programming languages (e.g., Java) provide the ability to group object classes and define a hierarchy among the groupings. For example, in Java, a package is a collection of classes. Packages can be nested to form a hierarchy.

Compatibility Assessment Overview

A variation in either hardware 206 or application environment 204 can result in a new operating platform 200 that can cause an incompatibility with an application (e.g., applications 202A–202C) that is intended to run in operating platform 200. For example, the instruction set supported by one central processing unit may differ from that supported by another central processing unit. The functionality supported in one program library contained in application environment 204 may not be supported in another program library. In either case, the functionality that is needed by the application (e.g., applications 202A–202C) may no longer be available after a change in operating platform 200.

Embodiments of the invention can be used to assess whether an application (e.g., applications 202A–202C) is compatible with operating platform 200. A specification that describes programming resources of operating platform 200 is described by a definitional language. A compatibility engine is executed to resolve an application to the specification. The output of the compatibility engine identifies whether the application conforms to operating platform 200 and how it deviates from the specification.

At least one specification is generated that describes programming resources (e.g., packages, classes, and method names) of operating platform 200 and information about the programming resources (e.g., ownership hierarchies, compliance status, and inline annotations). If more than one specification is used to describe operating platform 200's programming resources, the specifications are merged into a combined specification. Each specification is converted into an internal representation which is merged with the internal representations of the other specifications based on the rules described below. A specification's internal representation is comprised of specification references that are internal representations (i.e., data descriptions) of operating platform 200's programming resources. The order in which the specifications are processed is important as it describes precedence in the merge process.

Figure 3:
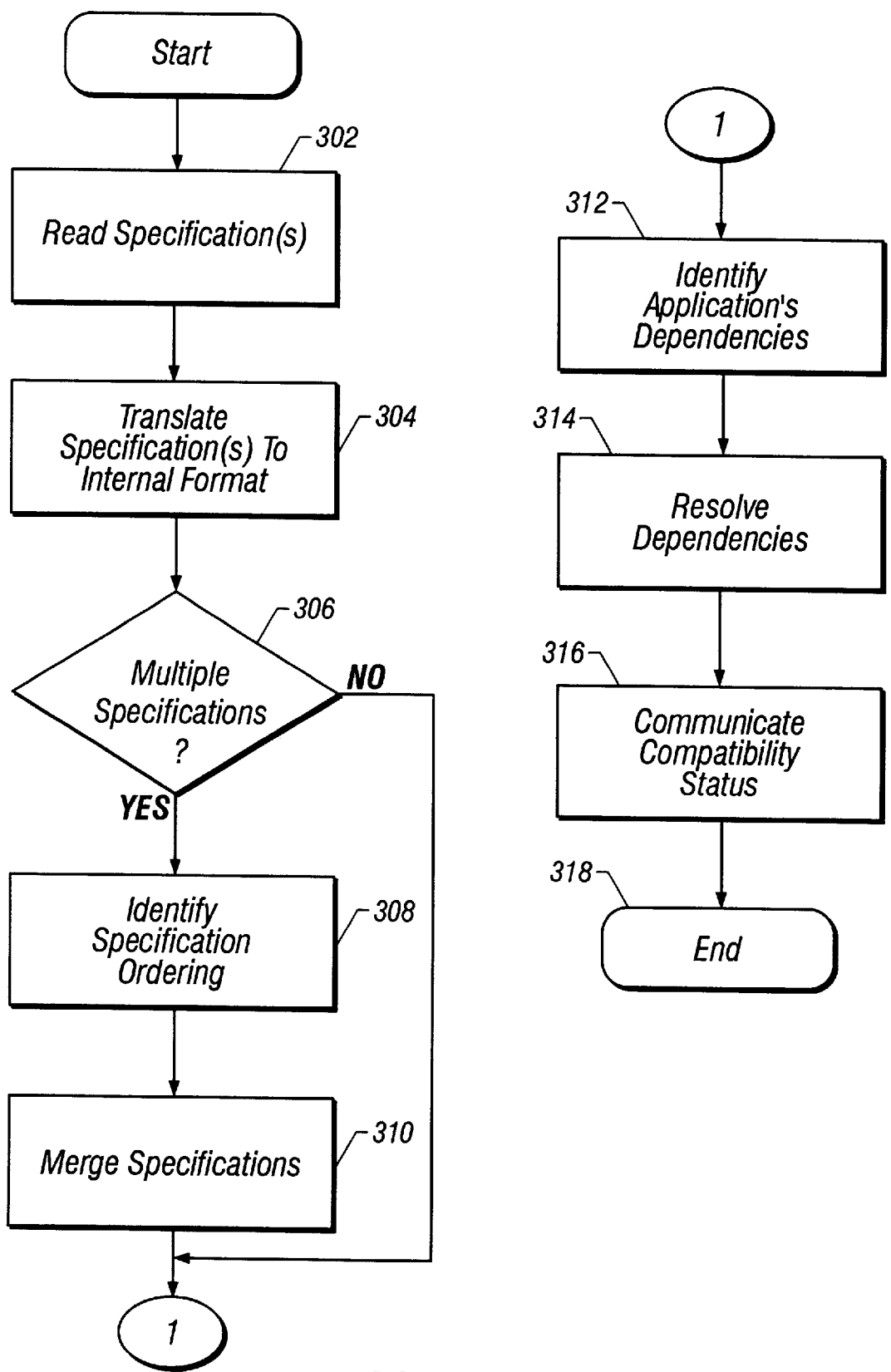
FIG. 3 provides an overview of the compatibility process according to an embodiment of the invention.

FIG. 3 provides an overview of the compatibility process according to an embodiment of the invention. At step 302, the specifications that define operating platform 200 are read. At step 304, the specifications are translated into an internal representation. The internal representation is comprised of specification references that store the attribute information associated with a specification file entry. Further, the internal representation retains the hierarchical information expressed in the specification file. The internal representation is discussed in more detail below. At step 306, a determination is made whether there are multiple specifications. If not, processing continues at step 312.

If there are multiple specifications, processing continues at step 308 to determine the ordering of the specifications. At step 310, the specifications' internal representations are merged. Merging specifications is discussed in more detail below. Processing continues at step 312 to identify the application's dependencies that exist in the application's program code at step 312. For example, in object-oriented program code, a first class may contain a method that has a parameter or return value which is defined to be a second class type. The referenced class type is defined to be a dependency of the first class.

In Java, an application is comprised of at least one class file that contains a class definition. The class file is the output of the Java compiler that translates the software instructions into VM instructions. Thus, the class file is comprised of a set of bytecodes and their associated parameters that includes the return value. During step 312, an application's Java class files are parsed and the bytecodes interpreted to reconstruct the dependencies.

At step 314, the dependencies identified in step 312 are compared against the application's set of programming resources and, if necessary, the programming resources specified in the specification(s). At step 316, the conformance status of a reference to the specification is reported and the overall compatibility status is communicated. The process ends at step 318.

Specifications

In an embodiment of the invention, a specification identifies programming resources defined in application environment API 208 (e.g., an application environment API for a Java platform). For example, a Java-based application environment API 208 includes package, class, and method API definitions. A specification includes specifiers that identify the programming resources of application environment API 208 and provide information about the programming resources. A specification is represented in text by a grammar that is derivative of the Standard Generalized Markup Language (SGML).

The grammar defines specifiers and the syntax of the specifiers is implemented by the tags. The specification grammar defines specifiers describing package, class and methods. The syntax of a specification file is described by tags that implement the specifiers. The grammar enforces scoping of tags in much the same manner as packages and classes are scoped. Further, the grammar identifies a set of rules for generating an instance of a specifier. Appendix A provides examples of specification files using the grammar.

A specification file can be generated using a text editor, for example. Further, there are SGML editors that provide assistance (e.g., provide shortcuts in generating the SGML tag, syntax and indentation) in writing an SGML file. Further, there are a number of parsing tools currently available that can be used to parse an SGML document to identify the SGML tags contained in an SGML document.

A specifier identifies the methods, classes, packages etc. of application environment 204 that a program can access and use. The following illustrates the grammar used to define and generate specification file entries.

```
Tags:
        <specfile>,             </specfile>
        <package>,              </package>
        <class>,                </class>
        <method>,               </method>
        <comment>,              </comment>
Grammar:
SPECIFIERS == PACKAGESPECIFIER | CLASSSPECIFIERS |
METHODSPECIFIER
SPECIFILE == <specfile name=NAME [version=VERSION]
[href=URL] >
        [COMMENT]
        [PACKAGESPECIFIER]*
        </specfile>
PACKAGESPECIFIER ==
        <package name=NAME status=statusValue [href=URL] >
        [COMMENT]
        [PACKAGESPECIFIER | CLASSSPECIFIER]*
        </package>
CLASSSPECIFIER ==
        <class name=NAME status=statusValue [href=URL] >
        [COMMENT]
        [METHODSPECIFIER]*
        </class>
METHODSPECIFIER ==
        <method name=NAME signature=SIGNATURE status=statusValue
                [href=URL] >
        [COMMENT]
        </method>
COMMENT == <comment>text*</comment>
SIGNATURE == Class file description string for a method
NAME == name syntax such as the standard Java name syntax
URL == standard URL syntax
```

The [SPECIFIER] followed by an asterisk ("*") indicates that zero or more specifiers can be included in a specification file. As indicated in the grammar, SPECIFIER is defined as a package specifier, a class specifier, or a method specifier. Thus, a specification contains a SPECFILE beginning and ending tag with none or more package tags within the SPECFILE specifier.

The SPECFILE specifier includes the beginning and ending SPECFILE tags, <specfile> and </specfile>, respectively. The SPECFILE tag acts as a delimiter for the specification file. The SPECFILE tag can include a name attribute value, and optional version and href attribute values. The value assigned to the name attribute provides a name for the specification. The version identifies a version for the specification. The href attribute identifies a universal resource locator (URL) that points to a location that has further information about the specification (e.g., web document).

A package specifier (i.e., PACKAGESPECIFIER) identifies the information associated with a package. A package specifier is identified in the specification file using the <package> start tag and the </package> ending tag. The package specifier includes a name and an optional href attribute. Zero or more package and class specifiers can be nested within a package specifier.

A class specifier (i.e., CLASSSPECIFIER) is delimited by the <class> and </class> beginning and ending (respectively) tags. A class specifier includes a name and an optional href. A class specifier can include zero or more nested methods.

A method specifier (i.e., METHODSPECIFIER) includes the name and a signature attribute. The signature attribute identifies the name, argument list and return type for a method. The signature information is stored in a text string with delimiters that identify the different fields of information stored in the signature. An example format for a signature is provide in the book entitled "The Java Virtual Machine Specification," by T. Lindholm and F. Yellin (Addison-Wesley).

The specification, package, class and method specifiers can include an optional COMMENT field which is a free-format text field for annotating the package, class or method specification. The COMMENT can be used to provide additional information about the entry (e.g., additional information regarding the compliance status or entry itself).

Compliance Status

The specification file grammar includes an attribute that identifies the compliance status of a package, class or method defined in the specification. As will be discussed below, the status attribute is used during compatibility assessment. The compliance status attribute can have a statusValue of "required" (i.e., "supported"), "optional," "modified" or "unsupported."

If the status attribute has a value of "required," it indicates that the associated entry is required to be included in application environment API 208. If the "required" status is assigned to a class or method, the class or method is included in application environment API 208 and can be called by an application. A package, class or method can have a "required" compliance status.

The "optional" attribute indicates that the entry may or may not be included in application environment API 208. If none of the specifications that define operating platform 200 change an entry's "optional" status, it is unclear whether the entry is a part of the application environment API 208. The entry (e.g., a package, class or method) should not be used until the application environment API 208 is modified to include the entry. The "optional" compliance status can be used for a package, class or method.

If an entry has a compliance status of "modified," the entry has been changed (with respect to a superset of the platform implementation from which the specification derives). For example, a class or method with a "modified" compliance status indicates that the definition for the class or method has been changed. For example, application environment API 208 may specify that a "window" class (i.e., a class used to generate a window in a graphical user interface or GUI) has been "modified." It alerts an application programmer to the modification so that the programmer can determine whether the modification will affect the application's execution. The "modified" compliance status is typically used for class and method entries.

An "unsupported" compliance status identifies whether there is an implementation for an entry that can be used by an application. The "unsupported" compliance status can be used for a package, class or method. If a class or a method has an "unsupported" compliance status, the class or method is unavailable to the application. If a package has an "unsupported" compliance status, the entries in the package's hierarchy are also considered to be "unsupported."

Specification File Parse

Thus, a specification file is a text file that contains entries expressed using the specification grammar. A parser is used to interrogate a specification file. A specification file's text is read in to the parser. When a grammar tag is recognized by the parser, the type of tag (e.g., specification, package, class, method or comment) is determined and the information associated with a tag is extracted from the file. For example, the name, URL, and comments are extracted for the specification, package, class and method tags. Further, the compliance status is extracted for package, class and method tags. The signature is also extracted for a method tag.

A package stack is maintained that tracks the scope of ownership of incoming package and class tags relative to previously-parsed package and class tags. Class and package references are generally cached in hashtables within other package references according to a hash of the fully qualified name of the class or package. Duplicate tags can be detected and name conflicts can be resolved using the hashtables. A package's hashtable includes each package that it directly owns as well as the sub-packages that it indirectly owns (e.g., packages owned by a child of the parent package).

Figure 4:
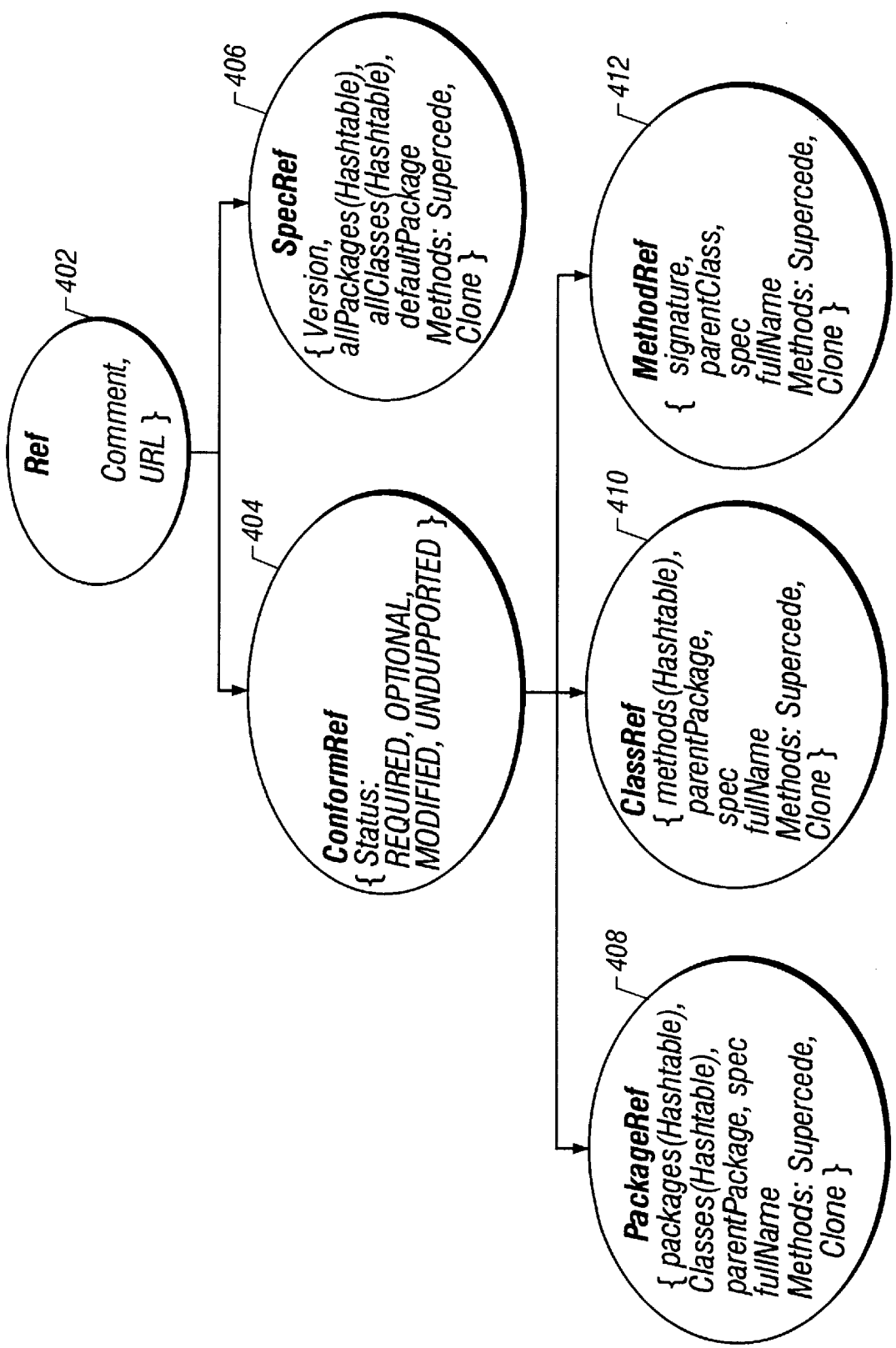
FIG. 4 provides examples of the structures generated using information parsed from a specification according to one embodiment of the invention.

FIG. 4 provides examples of the structures generated using information parsed from a specification according to one embodiment of the invention. The information is represented as objects (i.e., object-oriented programming units). The objects in FIG. 4 form a hierarchy such that the properties of a parent are inherited by a child class. For example, the root class Ref 402 contains the name, comment, and URL properties that correspond to the name, comment and URL attributes of the specification grammar. These properties are inherited by the other classes.

The objects in FIG. 4 are instantiated to create a specification tree representation from the specification file. The specification tree contains instances of SpecRef 406, PackageRef 408, ClassRef 410 and MethodRef 412 which are examples of specification references that form the internal representation of a specification file. Each of these instances includes a reference to their parent and each child (i.e., object instance owned by the instance). Hashtables contained in some of the instances can be used instead of traversing the specification tree to locate a particular node in the specification tree.

SpecRef 406 is an object class that is created when a SPECFILE tag is identified during parsing. SpecRef 406 contains hashed versions of every package and class entry in the specification file. SpecRef 406 also contains a pointer reference to a "default package" which is an instance of PackageRef 408 (described below) and acts as the top-level root of the package hierarchy from which all of the packages defined in the specification file derive.

ConformRef class 406 contains the compliance status property that corresponds to the compliance status specification attribute. PackageRef 408, ClassRef 410 and MethodRef 412 are children of the ConformRef 406 and inherit the compliance status property as well as the name, comment and URL properties of Ref 402.

An instance of PackageRef 408 is created for each package entry in a specification file. A pointer reference is included to the package entry's parent package and the specification that contains the package entry. PackageRef includes the hashtables for sub-packages and classes in the package entry's hierarchy.

A ClassRef 410 instance is created when a class tag is parsed. The ClassRef 410 instance contains a hashtable that contains a pointer reference to each of the methods owned by the ClassRef 410 instance. The ClassRef 410 instance includes a pointer reference is the instance's parent PackageRef 408 instance and to the SpecRef 406 instance.

The MethodRef 412 class is instantiated when a method tag is parsed. The MethodRef 412 instance contains a pointer reference to the class that contains the method and the specification file. The MethodRef 412 instance also includes the method's signature.

Figure 5:
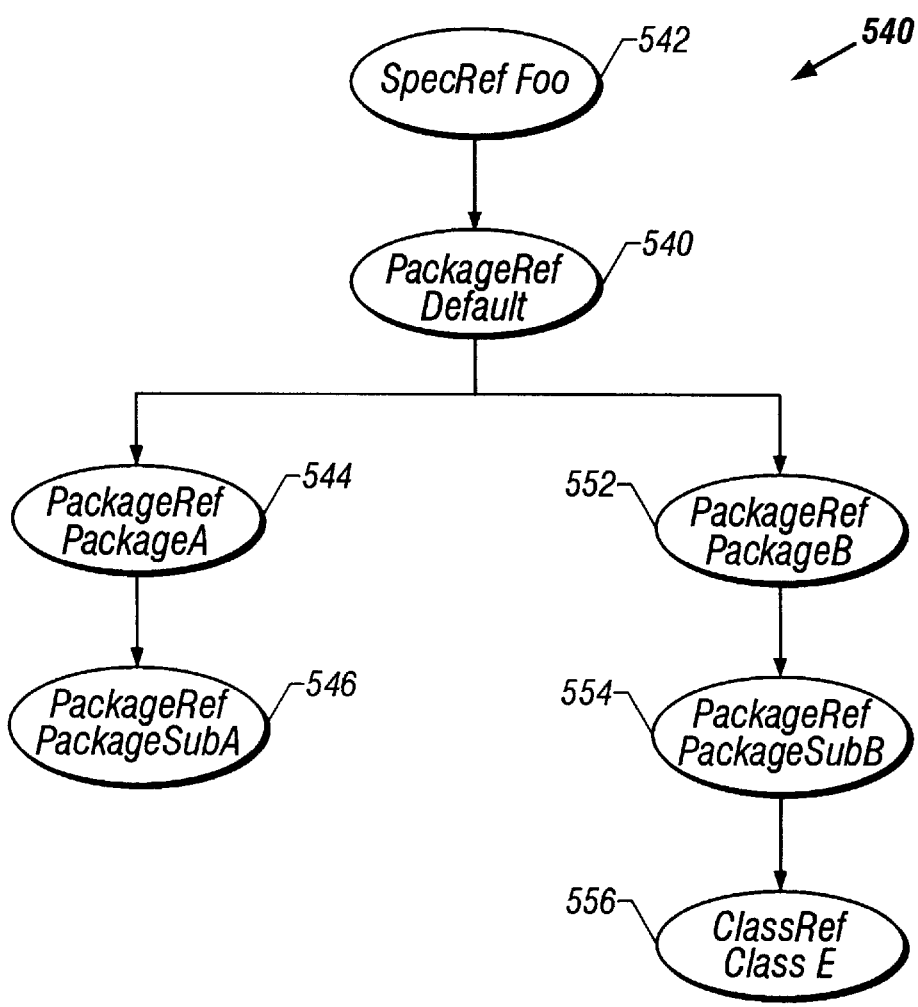
FIG. 5 provides an example of an object tree generated from a parse of an sample specification according to an embodiment of the invention.

The product of a specification file parse is a tree of objects (e.g., instances of the object classes illustrated in FIG. 4) whose root node is an instance of SpecRef 406. FIG. 5 provides an example of an object tree generated from a parse of an sample specification according to an embodiment of the invention.

Specification 500 contains lines 502–524 that provide a definition for a an application environment API (e.g., application environment API 208) using the specification grammar described above. As lines 502–524 are parsed, instances of the object classes shown in FIG. 4 are created and specification tree 540 is created. When line 502 is parsed, an instance of SpecRef 406 is created (i.e., node 542 of specification tree 540). Line 524 contains the ending SPECFILE tag.

An instance of PackageRef 408 is created (i.e., node 544 of specification tree 540) when line 504 is parsed. Since line 504 contains the first PACKAGESPECIFIER, node 540 (i.e., the default instance of PackageRef 408) is created. Node 544 is a child of node 540. Line 506 is contained within the <package> and </package> PACKAGESPECIFIER tags for "PackageA." Therefore, the package identified in line 506 is a subpackage of "PackageA." Thus, the PackageRef 408 instance created when line 506 is parsed, is added to specification tree 540 below node 544 (i.e., node 546). Node 544 contains a package hashtable that includes a pointer reference to node 546.

Line 510 of specification 500 contains an end tag for "PackageA." Thus, line 512 defines a package that is not a child of "PackageA." Node 552 is created for "PackageB" as a result of parsing line 512. Node 552 is a descendent of the default PackageRef 408 instance (i.e., node 540). Line 514 defines a subpackage (i.e., "PackageSubB") of "PackageB." A class is defined in line 516 that is a child of "PackageSubB" which is added as node 556, a child of node 554.

Nodes 540, 544, 546, 552, 554, 556 contain a pointer reference to their parent node. Further, nodes 540, 544, 546, 552, 554, 556 contain a pointer reference to the specification.

Merging Specifications

As previously discussed, it is possible to use more than one specification to define application environment API 208. For example, a first specification of application environment API 208 is intended for general use. A second specification of application environment API 208 can be generated that addresses a particular use of operating platform 200.

The order in which the specifications are identified to the parser determines which specification prevails when a conflict (i.e., two specifications include a different definition for the same programming resource of application environment API 208) exists between the specification files. Where multiple specifications are used, the content of a later-parsed specification takes precedence over the earlier-parsed specification's content.

For example, the first specification can define an application environment API 208 that is typically used for embedded systems. Class libraries that are typically used by embedded system applications are included in the application environment API 208 (e.g., Java Virtual Machine, standard Java, and Java I/O class libraries). However, a manufacturer of an embedded system may want to alter the application environment API 208 used in its operating platform 200. In this case, the manufacturer can write a second specification that identifies modifications to the first specification. Generally, when the two specifications are merged, an internal representation of a specification is created that reflects the portions unique to both, the common portions and the modifications to the first specification contained in the second specification.

Referring to FIG. 4, SpecRef 406, PackageRef 408, ClassRef 410 and MethodRef 412 have a method to clone themselves, Cloning is the process of creating a copy of the current specification reference (i.e., the internal representation of a programming resource) as well as all specification references that are "owned" by that specification reference. Further, each of these specification reference classes has a supersede method that can be used to overwrite the internal fields of one specification reference instance with the fields of another specification reference instance.

A single parser is used to parse the specification file(s) regardless of the number of specifications used to define application environment API 208. The parser reads the first specification, and creates a specification tree for the specification. A clone is made of the first specification's tree which is referred to as the merge tree. The parser reads any additional specifications and modifies the merge tree based on the additional specifications as discussed below. After all of the specifications have been parsed and their specification trees have been merged into the merge tree, the merge tree is used as the definition of application environment API 208 against which an application is compared to determine compatibility.

Figure 6:
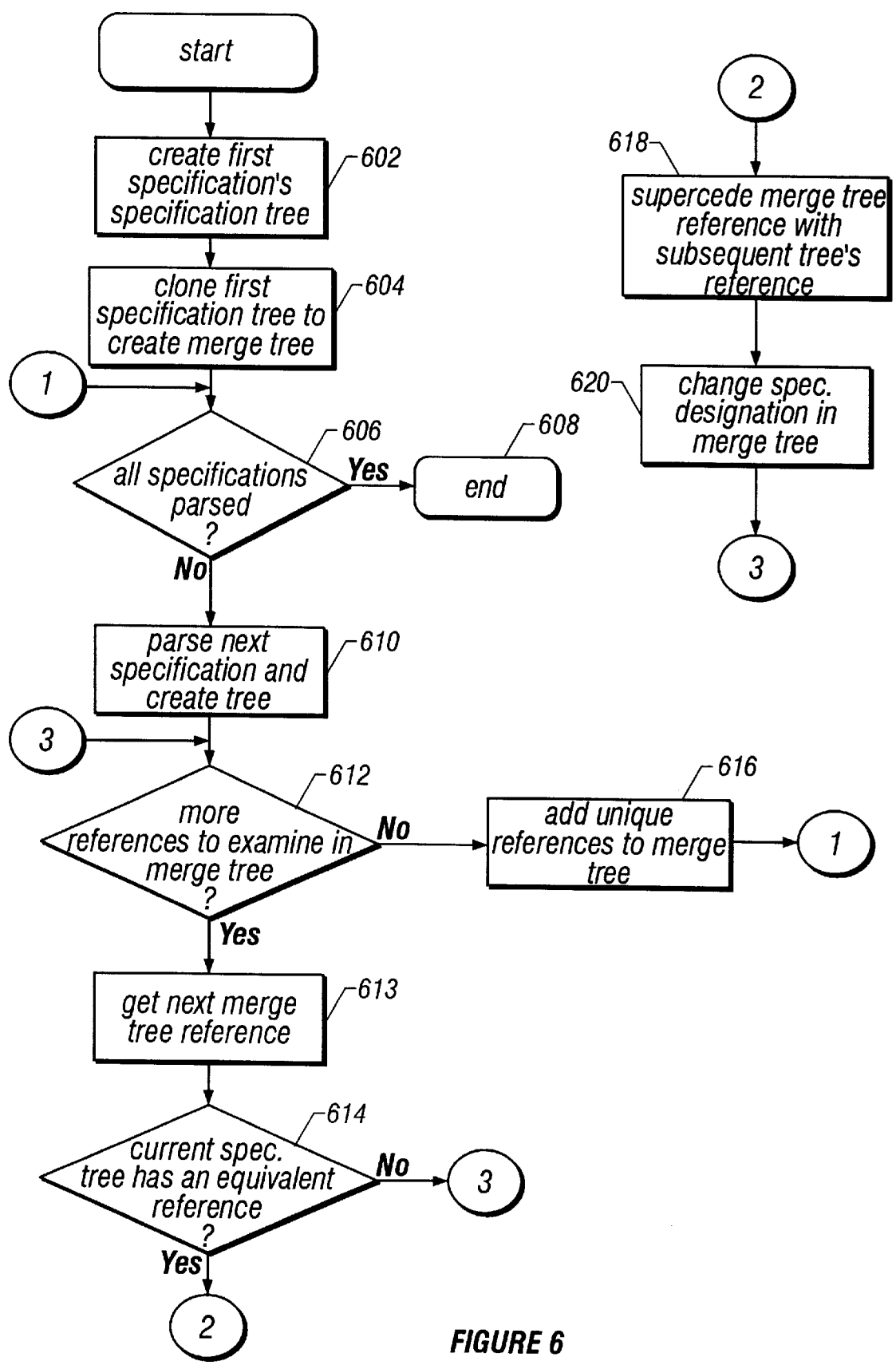
FIG. 6 provides a parse process flow according to an embodiment of the invention.

FIG. 6 provides a parse process flow according to an embodiment of the invention. At step 602, the parser reads the first specification and creates a specification tree based on the specification. At step 604, the merge tree is created by cloning the first specification's tree. The merge tree is used as the specification tree to which all subsequent specifications are merged.

At step 606, a determination is made whether all of the specifications have been processed. If so processing ends at step 608. If not, processing continues at step 610 to parse the next specification and create the specification's internal representation.

The parser processes each package, class and method specification reference in the merge tree to determine whether the current specification's tree contains an equivalent specification reference that modifies the merge tree specification reference. Therefore, at step 612, a determination is made whether there are any more specification references in the merge tree that have not been processed. If all of the merge tree's specification references have been examined relative to the current specification, processing continues at step 616 to add the current specification's unique specification references (i.e., those specification references that are new to the merge tree) to the merge tree. Processing continues at step 606 to process any remaining specifications.

If it is determined, at step 612, that there are more merge tree specification references, processing continues at step 613 to get the next merge tree specification reference. At step 614 to determine whether the current specification's tree has an equivalent specification reference. If not, processing continues at step 612 to process any remaining merge tree specification references. If there is an equivalent specification reference in the merge tree and the current specification, processing continues at step 618 to cause the merge tree's specification reference to be superseded by the subsequent tree's specification reference. Superseding is the process of copying the status, URL, and comments of the subsequent tree's specification reference over the same attributes in the merge tree's specification reference. At step 620, the "spec" attribute of the merge tree specification reference is also replaced to identify which specification is responsible for a given specification reference in the merge tree.

Figure 7A:
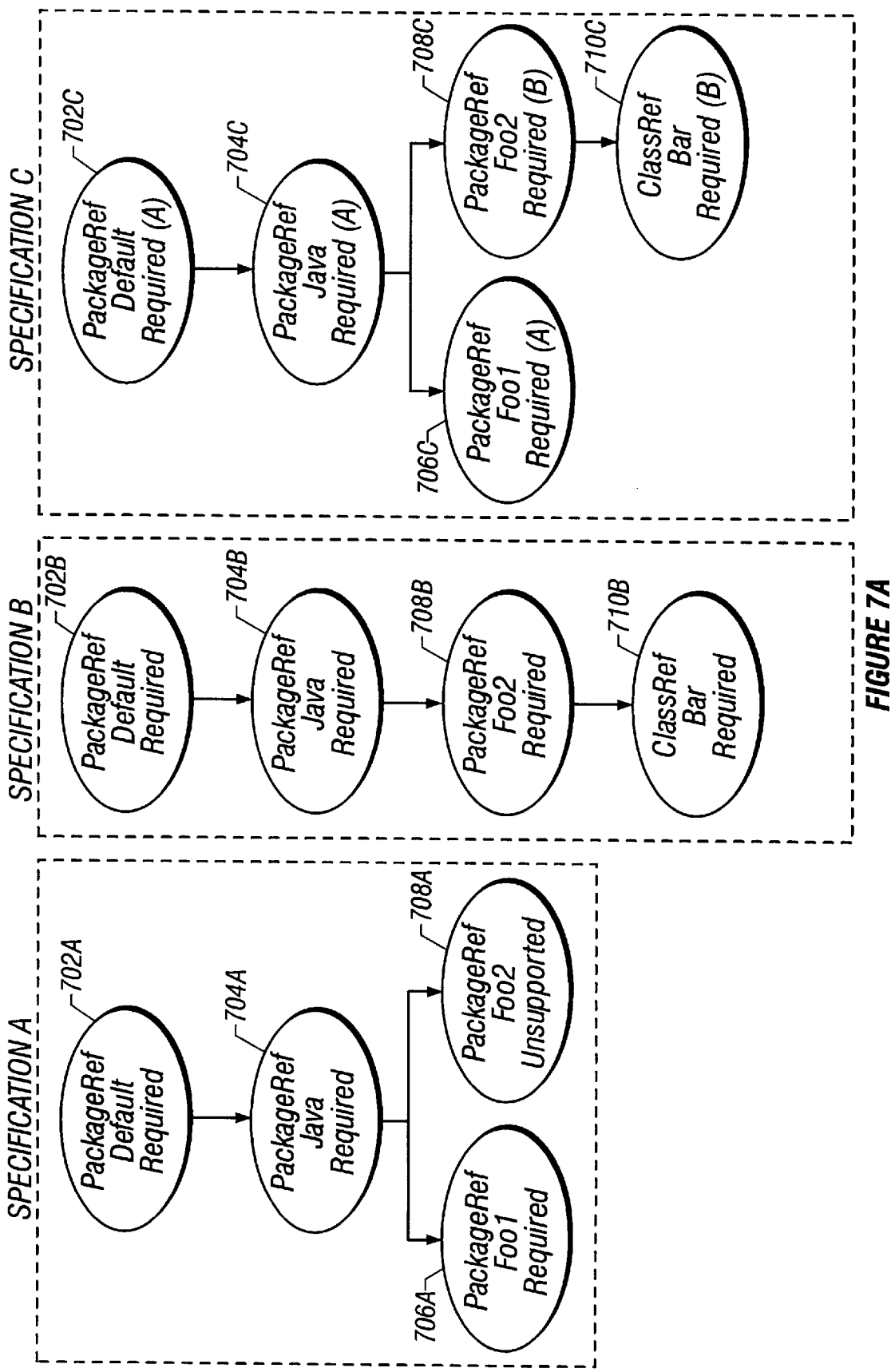
FIG. 7A illustrates specification trees containing references from two input specifications and a merged specification according to an embodiment of the invention.
Figure 7B:
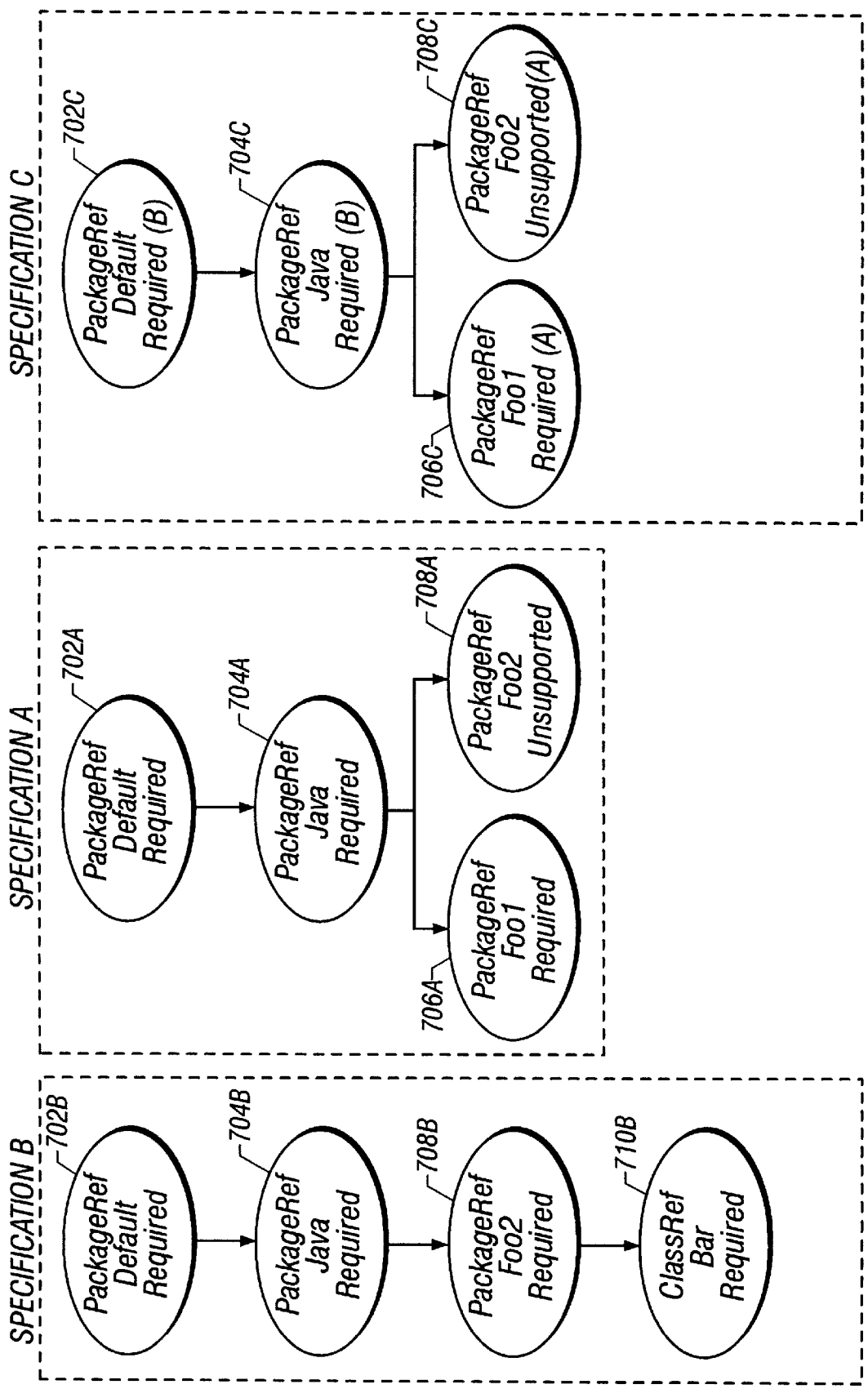
FIG. 7B reverses the order of specifications A and B of FIG. 7A.

The status of a specification reference affects what happens when a specification reference supersedes a merge tree specification reference. All specification references in a merge tree are considered "overrideable". That is, any specification reference, even if it has a status of "required" in the original specification, can be overridden by a subsequent specification reference. FIGS. 7A–7B provides some merging examples performed using an embodiment of the invention.

In FIG. 7A, specification trees containing specification references are depicted for two input specifications (that correspond to specifications A and B) and a merged specification (that corresponds to specification C). In this example, specification A is parsed before specification B. Specification A's tree is cloned to create specification C's tree (i.e., the merge tree). Specification A's tree contains package specification references 702A, 704A, 706A and 708A. Specification B's tree contains package specification references 702A, 704A, 708A and 710A. Each specification reference's status is provided along with the specification reference.

Specification reference 702A of specification A corresponds to specification reference 702B of specification B. However, because their definitions are equivalent, specification reference 702B does not supersede specification reference 702A. Similarly, specification reference 704B does not supersede specification reference 704A. Further, since there is no corresponding specification reference in specification B for specification A's specification reference 706A, it remains unchanged in the merge tree (i.e., specification C).

Package specification reference 708B, however, that corresponds to specification reference 708A reflects a compliance status change. Steps 618 and 620 of FIG. 6 are performed to copy specification reference 708B's status, URL, and comments attributes to specification reference 708C in the merge tree. In addition, the "spec" attribute of specification reference 708C is changed to point to specification B.

In FIG. 7A, a specification reference's status was changed from a first value (i.e., unsupported) to a second value (required). Further, it can be seen that earlier-defined specification references that have no corresponding specification references in subsequently-processed specification trees remain unaffected by merging. This is also true of earlier-defined specification references with corresponding specification references having an equivalent status value that are contained in subsequently-processed specification trees.

FIG. 7B reverses the order of parsing for specifications A and B of FIG. 7A. That is, specification B is parsed before specification A. In FIG. 7A, class specification reference 710B was merged into specification C from specification B. However, in FIG. 7B, class specification reference 710C does not exist in the merge tree.

Before specification A is processed, specification C contained a class specification reference that was equivalent to the class specification reference 710B. Thereafter, when specification A is processed, the merge tree class reference is eliminated. Package specification reference 708A's status changed the status of package specification reference 708C from "required" (the status of package specification reference 708B) to "unsupported" (the status of package specification reference 708A). When a merge tree specification reference's status changes from "required" to "unsupported" as a result of a subsequent specification reference, all of the owned specification references are deleted from the merge tree. Conversely (as illustrated by package specification references 706A and 706C) package, class, or method specification references introduced in subsequently-processed specifications are added to the merge tree.

Figure 7C:
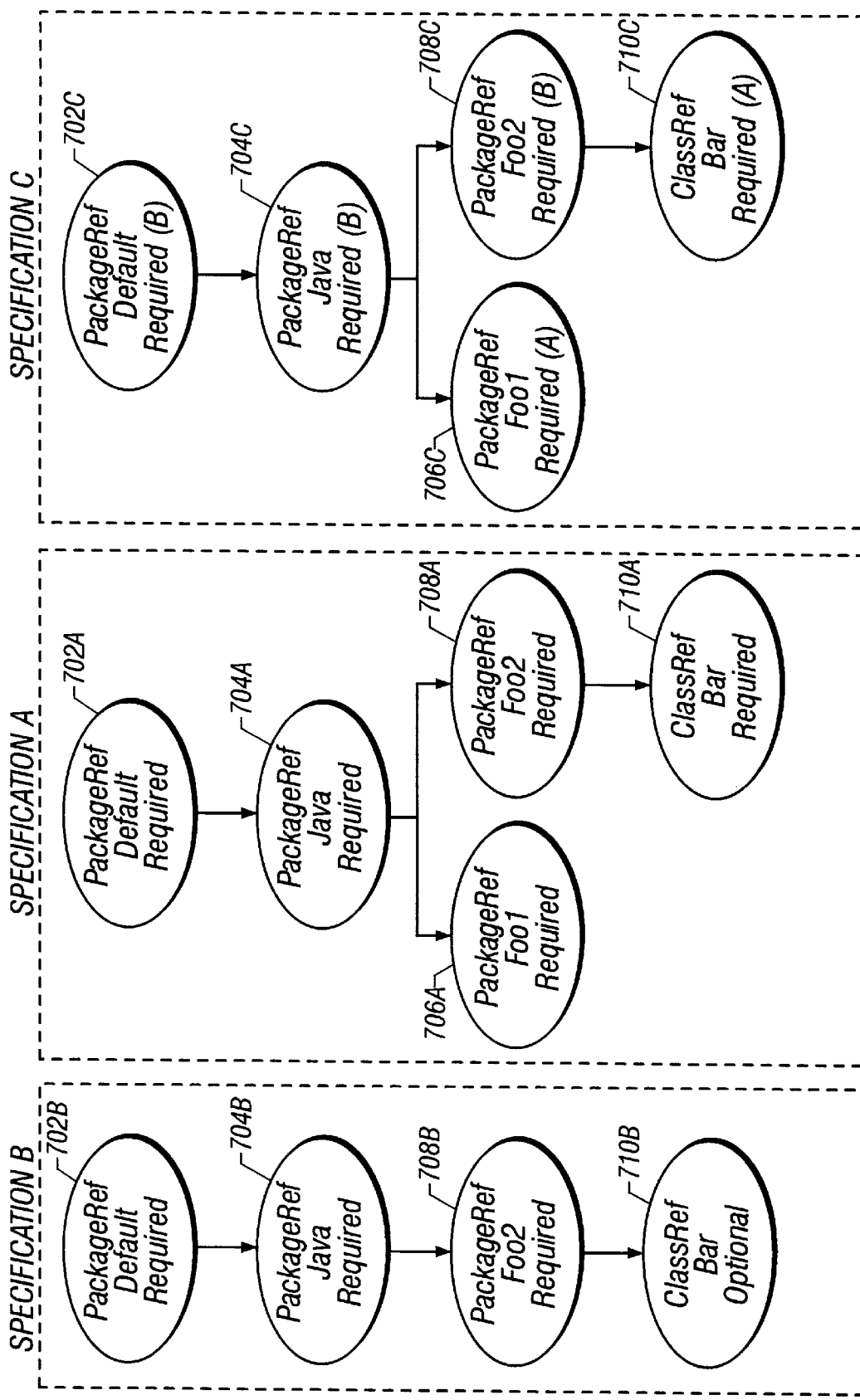

Referring to FIG. 7C, specification A contains class specification reference 710B that has an "optional" status. If this status is unchanged by subsequent specifications (i.e., the merge tree class specification reference's status is "optional"), a reference to class "Bar" in an application compared against the merge tree will produce an error indicating that class "Bar" is unavailable in operating platform 200. Application environment API 208 should be updated to include class "Bar" before an application using the class can function as intended.

Specification C which represents the resulting merge tree in the example of FIG. 7C illustrates the status of class specification reference 710C after the parse of specifications B and A. As the second specification parse, specification A updated class specification reference 710C from its original "optional" status to a "required" status indicating that class "Bar" is a required class in application environment API 208 (i.e., class "Bar" is included in application environment API 208 and can be called by an application).

Application Dependencies

As discussed above, an application can contain a reference on which it depends to execute. In an object-oriented program, a method can contain a parameter or a return type that is defined as a class type. The class type may or may not be defined in the application's program code. References that are not defined within the application's program code are referred to as external references.

An application can also define programming resources. For example, an application can define a class or method within a class that can be used as a programming resource.

To assess whether the application's dependency references are resolvable, the application's dependencies must first be identified. The dependency references can then be resolved (by name) or those references that cannot be resolved can be identified. To assess whether a dependency reference can be resolved, embodiments of the invention create an application dependency tree that is similar in format to the specification tree. The dependency tree identifies the application's programming resources and its dependency references.

The application program files are parsed to identify the dependency references. The references includes information (e.g., a name attribute) that point back to a programming resource. Once an application's dependency tree is created, each dependency can be processed to determine whether it can be resolved. If the dependency reference cannot be resolved within the application, the specification tree can be examined to determine whether a specification's reference (i.e., package, class or method specification references, generally class specification references) can resolve the dependency reference.

The Java programming language is one example of a programming language that can be used to write an application program. In Java, each class (source) is compiled into a file referred to as a class file. A class file contains the bytecode representation of the class. A class file contains pools of information that represent references to other classes, fields, and methods. All class references that are used to describe a class are stored in the classes "Constant Pool". Constants in the constant pool are descriptors that represent a reference to another class. The descriptors also refer to strings in a string table to provide symbolic information for the constant.

A class file refers to these descriptors in other tables that it stores. These tables include interfaces that the class implements, fields contained in the class, methods that are implemented, and attribute tokens that describe access and other key descriptions associated with a field or method. The following provides an example of the type of information contained in a class file.

```
Class File
{   Constant Pool
    Access Flags
    Interface Descriptors
    Field Descriptors
    Method Descriptors
    Attribute Descriptors
    "This" class descriptor
    Super-class descriptor
}
```

Each class file has enough symbolic information to identify dependency references (e.g., dependency references within the class and to other classes). A first level representation of a class file is generated using the information contained in the class file. That is, the class file is parsed to identify the fields, methods and return types contained in the class file.

The second level of representation can be generated after internal references are resolved in the first level. When a field, method or return type is found in the class file, a structure referred to as a dependency reference is created and retained in a table.

A Java application may consist of one or more class files. Each of the application's class files are parsed and dependency references are created for each class file. The result is a table that contains all of the application's dependency references. An "allClasses" hashtable is generated that contains all of the class files that are defined for an application.

The second level representation forms a tree of dependency references (similar to a specification tree) from the class file representation. Each dependency reference is examined against other class file representations or to the application environment API 208's specification to determine whether it is resolvable. A reference string Is used to hash either within a specification tree, or a set of other class files to locate and resolve a dependency reference.

Figure 8A:
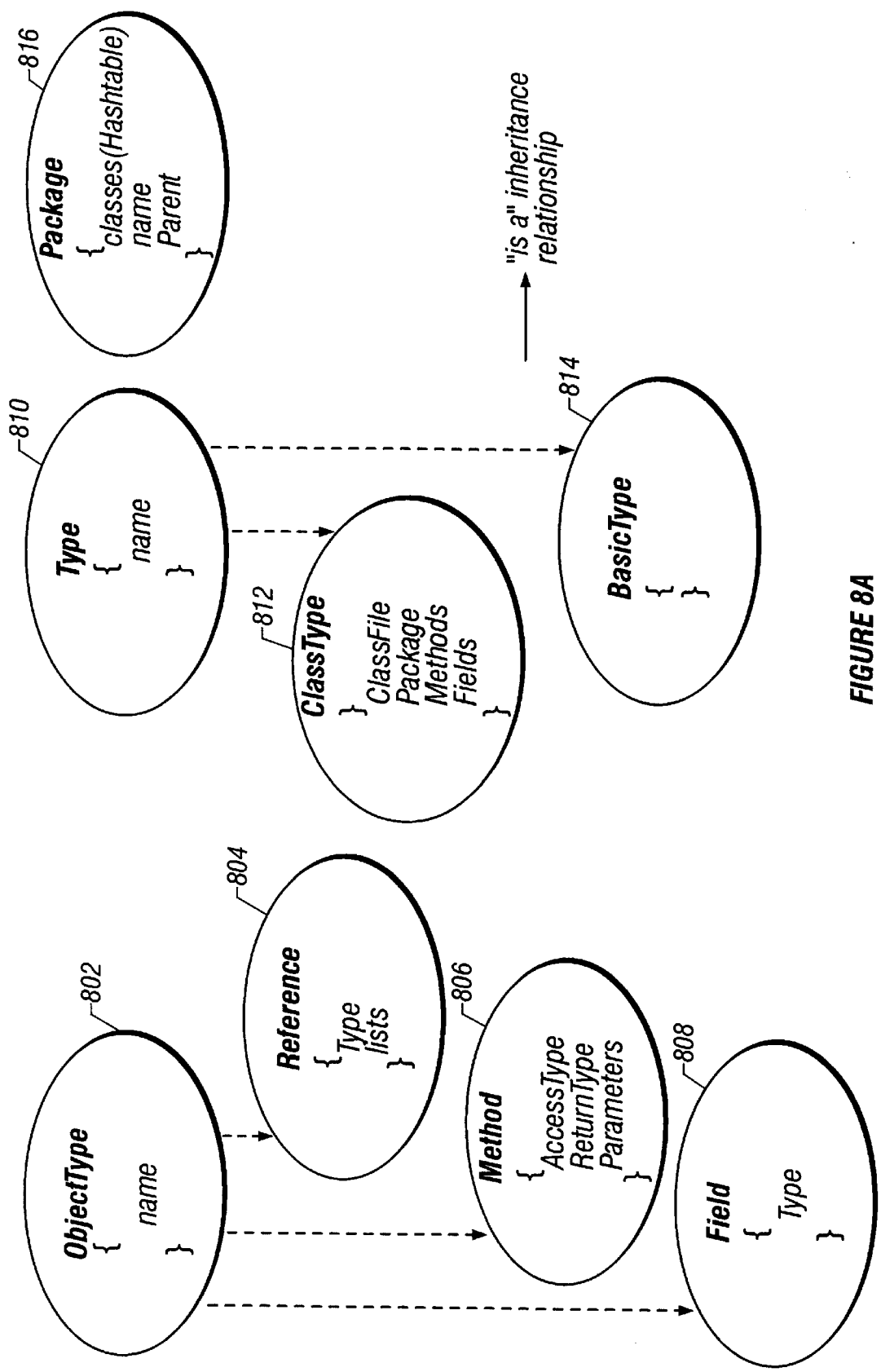
FIG. 8A provides an example of object classes used in the second level representation of a class file according to an embodiment of the invention.

FIG. 8A provides an example of object classes used in the second level representation of a class file according to an embodiment of the invention. ObjectType 802 is a class that represents the set of constructs of interest in a Java class file. Examples of such constructs are Method 806 and Field 808 that represent method and field constructs within a Java class file and are implemented as classes that inherit from ObjectType 802. The API for Method 806 and Field 808 classes is described by Reference 804 (i.e., a reference can be used to express the "type" of a field or the "parameters" and "return type" of a method). Reference 804 is associated with a type and can specify whether a type is used in an array.

Type class 810 can either be a BasicType 814 or a ClassType 812. ClassType 812 can be resolved to an existing class file or is unresolvable within the application's program code. An instance of reference 804 that is associated with an instance of class type 812 that is not resolvable within the application can be compared against application environment API 208's specification to determine whether the reference 804 instance is externally resolvable.

Figure 8B:
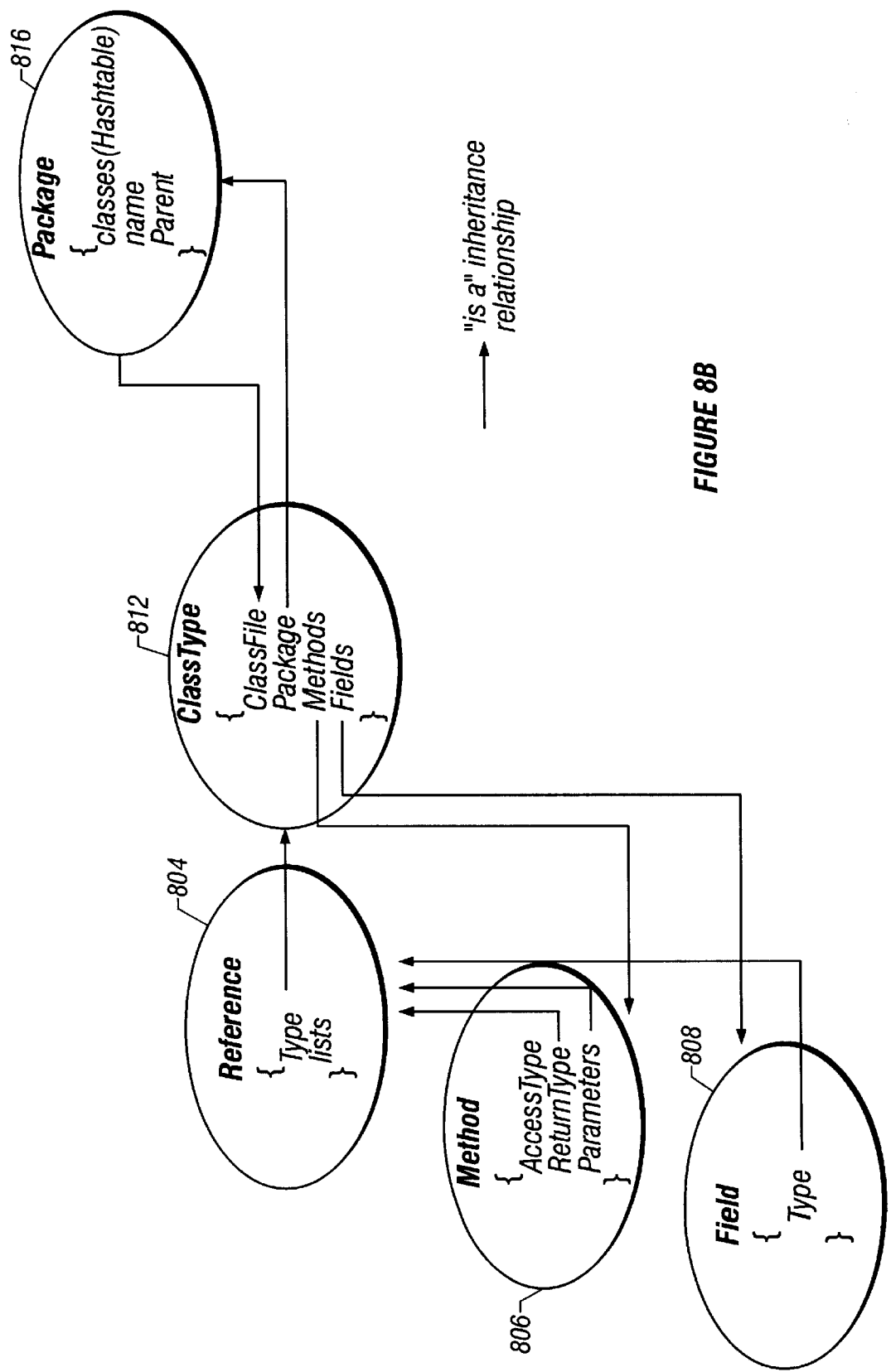
FIG. 8B illustrates associations between object classes of FIG. 8A.

FIG. 8B illustrates associations between object classes of FIG. 5A. Reference 804 is associated with ClassType 812, More than one instance of Reference 804 can point to an instance of ClassType 812. A returnType and Parameters of an instance of Method 806 can point to an instance of Reference 804. Similarly, a Type of Field 808 can point to an instance of Reference 804. Each instance of Reference 804 represents a dependency in the application. For example, a reference to a class occurs when a return type, parameter or field type are defined to be of type class. The reference to the class causes an instance of reference 804 to be created.

ClassType 812 contains a reference to the class file in which it is defined, the package in which the class is contained, and the methods and fields contained in the class. ClassType 812 does not necessarily have to resolve to a class file. If ClassType 812 does not resolve to a class file, it contains the symbols that can be used to determine whether it is externally resolvable (e.g., in a specification tree).

Package 816 contains a classes hashtable that contains a reference for each Class file. Methods attribute of ClassType contains a reference to each instance of Method 806 and each instance of Field 808 that represent methods and fields (respectively) in a class file.

All of the class and package references are hashed into tables after they are created. A second pass is made through the classes after all of the references are created from the class files. This second pass resolves dependency references for each class that are resolvable within the application.

Resolving Dependencies

Some of the dependency references are resolvable by other class files that comprise the application (i.e., an external dependency reference or external reference). For those dependency references that are not resolvable within the application, the specification tree that represents application environment API 208 can be consulted to determine whether an external dependency reference is resolvable.

Figure 9A:
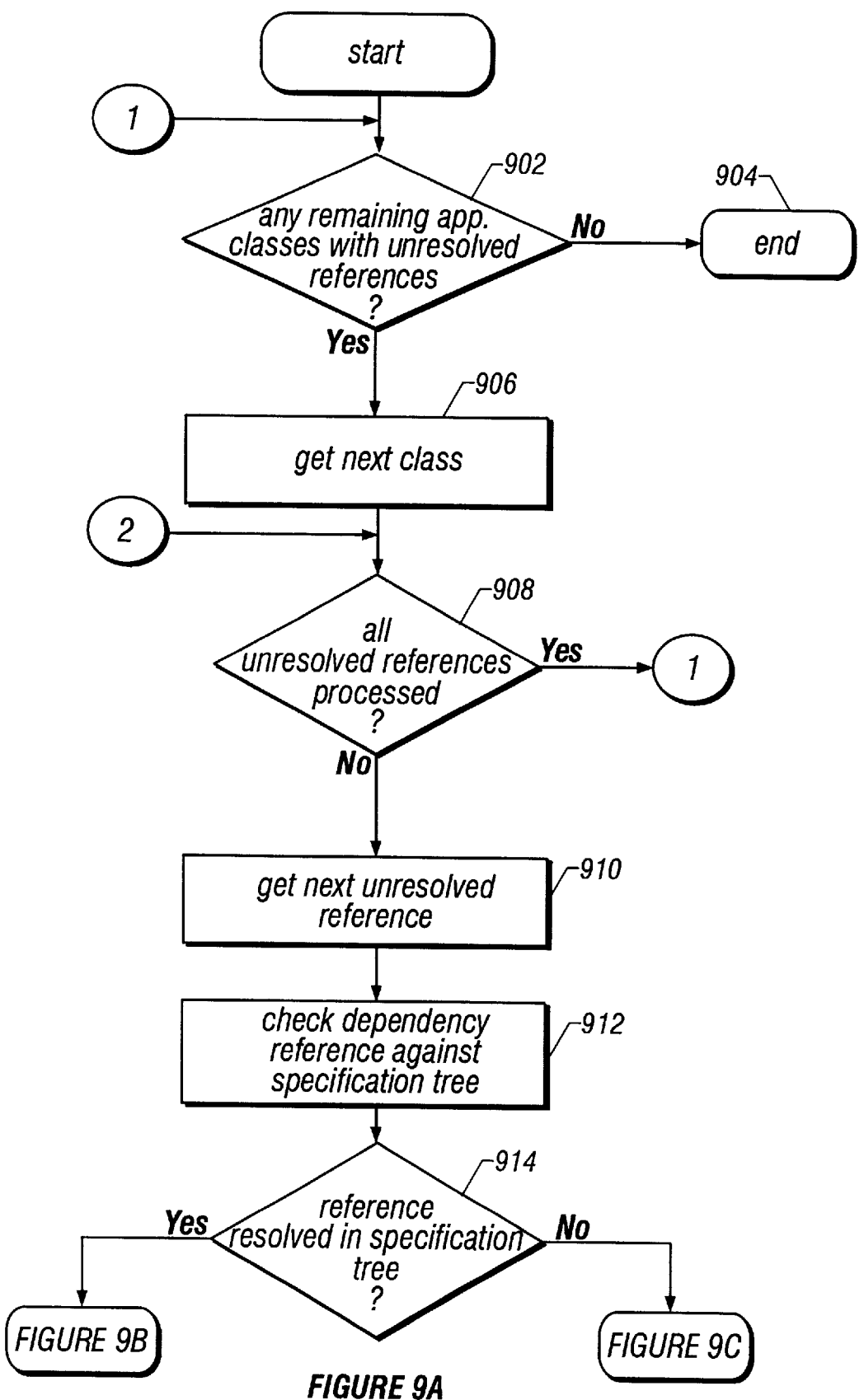
FIGS. 9A–9C provide a dependency reference resolution process flow according to an embodiment of the invention.
Figure 9B:
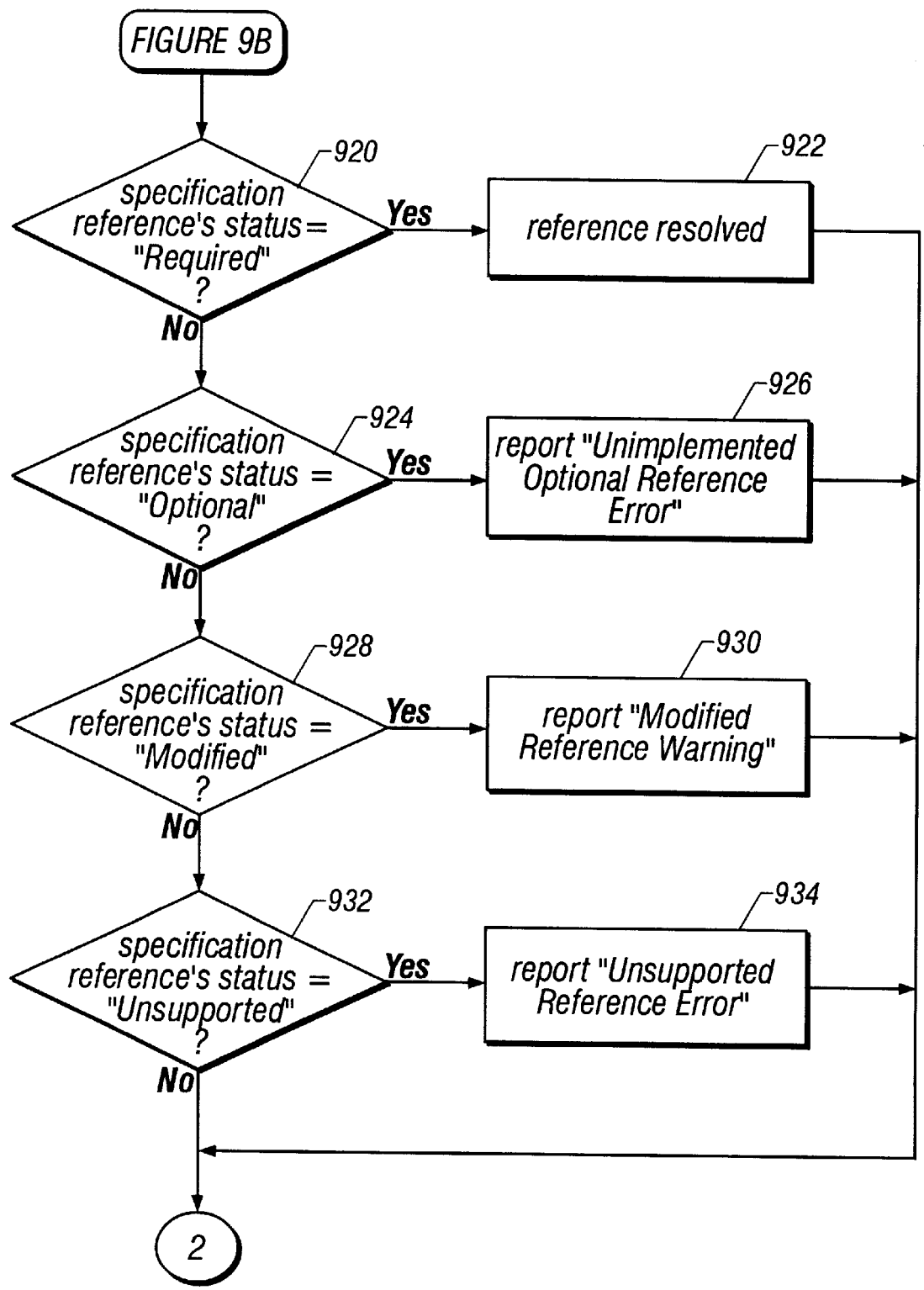

FIGS. 9A–9B provide a dependency reference resolution process flow according to an embodiment of the invention. All of the application's classes that contain references that are to be resolved are examined. Thus, at step 902, a determination is made whether all of the classes have been processed. If so, processing ends at step 904.

If there are some classes that have not yet been processed, processing continues at step 906 to get the next application class. At step 908, a determination is made whether all of the references that need to be resolved in the current class file have been processed. If so, processing continues at step 902 to process any remaining classes.

If one or more references of the current class have not been processed for resolution, processing continues at step 910 to get the next reference. At step 912, the current reference (e.g., an instance of reference 804) is checked against the specification tree created for application environment API 208 to determine whether the reference exists in the application environment API 208. If the reference exists in application environment API 208, processing continues at step 922 of FIG. 9B. If the reference does not exist in application environment API 208, processing continues at step 942 of FIG. 9C. In FIG. 9B, the status of the specification reference that corresponds to the current reference is determined and the current reference is processed based on the specification reference's status. At step 920, a determination is made whether the specification reference's status is set to "Required." If so, processing continues at step 922 to indicate that the current reference is reported resolved, and processing continues at step 908 of FIG. 9A to process any remaining references.

If it is determined (at step 920) that the specification reference is not set to "Required," processing continues at step 924 to determine whether the status is set to "Optional." If the status is set to "Optional," an "Unimplemented Optional Reference Error," is reported at step 926 and processing continues at step 908 of FIG. 9A to process any remaining references.

If it is determined (at step 924) that the specification reference is not set to "Optional," processing continues at step 928 to determine whether the status is set to "Modified." If the status is set to "Modified," processing continues at step 930 to report a "Modified Reference Warning," and processing continues at step 908 of FIG. 9A to process any remaining references.

If it is determined (at step 928) that the specification reference is not set to "Modified," processing continues at step 932 to determine whether the status is set to "Unsupported." If the status is set to "Unsupported," processing continues at step 934 to report an "Unsupported Reference Error," and processing continues at step 908 of FIG. 9A to process any remaining references. If it is determined (at step 932) that the specification reference is not set to "Unsupported," processing continues at step 908 of FIG. 9A to process any remaining references.

Figure 9C:
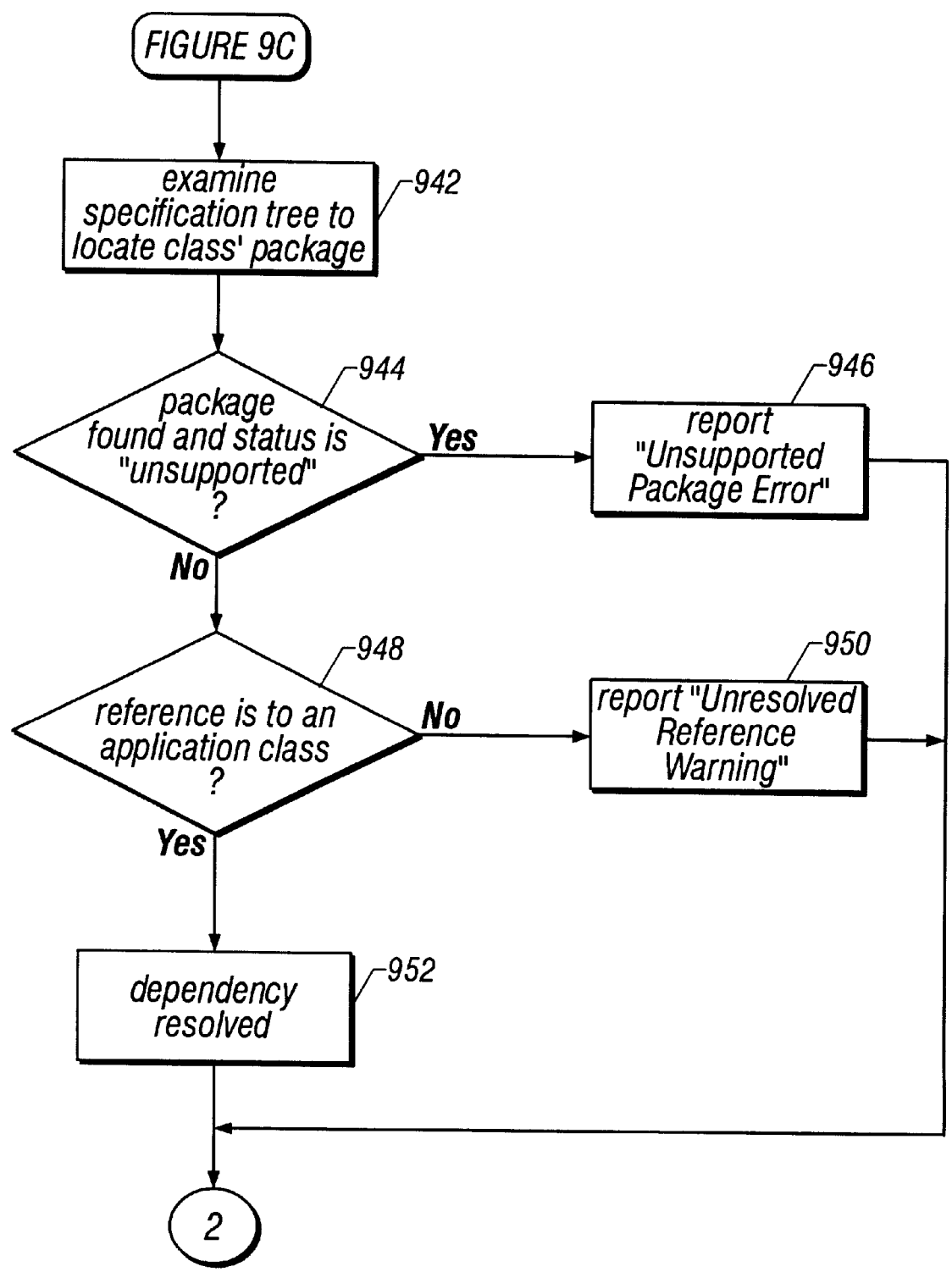

Referring to FIG. 9C, a reference that is not found in the specification tree is processed using steps 942–952. At step 942, the specification tree is examined to locate a class' package. If, at step 944, it is determined that the package was found and that the package's status is set to "Unsupported," processing continues at step 946 to report an "Unsupported Package Error." If not, processing continues at step 948 to examine the application's dependency tree to determine whether the reference can be resolved within the application. If so, processing continues at step 952, since the reference is resolved. If not, processing continues at step 950 to report an "Unresolved Reference Warning." In either case, processing continues at step 908 of FIG. 9A to process any remaining references.

Thus, a method and apparatus for assessing compatibility between platforms and applications has been provided in conjunction with one or more specific embodiments. The invention is defined by the claims and their full scope of equivalents.

What is claimed is:

1. A method of evaluating compatibility between an operating platform and an application using a computer system comprising:

generating a programming resource tree using at least one specification that identifies programming resources of said operating platform;

identifying programming resources of said application and a dependency contained in said application;

determining whether said dependency in said application is resolvable to one of said programming resources of said at least one specification and said application.

2. The method of claim 1 wherein said at least one specification comprises a first specification and a second specification said step of generating a programming resource tree further comprises the steps of:

parsing said first specification to generate a programming resource tree having references contained in said first specification;

modifying said programming resource tree to include references contained in said second specification.

3. The method of claim 2 wherein said step of modifying said programming resource tree to include references contained in said second specification further comprises the steps of:

determining whether a programming resource tree entry exists that corresponds to one of said references contained in said second specification;

modifying said programming resource tree entry to reflect a status of said one of said references contained in said second specification, if said programming resource tree entry exists and said status of said programming resource tree entry does not correspond to said status of said one of said references contained in said second specification;

adding an entry in said programming resource tree that corresponds to said one of said references contained in said second specification, if said programming resource tree entry does not exist.

4. The method of claim 3 wherein said step of modifying said programming resource tree entry to reflect a status of said one of said references contained in said second specification further comprises the step of:

removing child references of said programming resource tree entry in said programming resource tree when a status of said one of said references contained in said second specification is unsupported.

5. The method of claim 3 wherein said step of modifying said programming resource tree entry to reflect a status of said one of said references contained in said second specification further comprises the steps of:

modifying said programming resource tree entry to reflect universal resource locator (URL) and comment attributes of said one of said references contained in said second specification; and modifying a specification attribute of said programming resource tree entry to indicate said second specification.

6. The method of claim 1 wherein said step of identifying programming resources of said application further comprises the step of:

generating a dependency tree of said application, said dependency tree identifying said application's programming resources.

7. The method of claim 1 wherein said step of determining further comprises the steps of:

determining whether a programming resource of said application can resolve said dependency;

determining whether a programming resource of said at least one specification can resolve said dependency, if none of said programming resources of said application can resolve said dependency.

8. The method of claim 7 wherein said step of determining whether a programming resource of said at least one specification can resolve said dependency further comprises the steps of:

marking said dependency as resolved, if said one of said programming resources of said at least one specification corresponds to said dependency and has a status of required;

marking said dependency as unresolved if said one of said programming resources of said at least one specification corresponds to said dependency and does not have a status of required.

9. A compatibility evaluation system comprising:

an application containing a plurality of dependencies;

a plurality of programming resource trees identifying programming resources of an operating platform and said application;

a compatibility engine configured to examine said plurality of programming resource trees to assess whether said plurality of dependencies of said application are resolvable by said programming resources.

10. The system of claim 9 wherein said operating platform includes an application environment and an application programming interface.

11. The system of claim 9 wherein said programming resources are defined using the Java programming language.

12. The system of claim 11 wherein said programming resources include class, method, and package programming resources.

13. The system of claim 12 wherein said compatibility engine is configured to examine whether said plurality of dependencies of said application are resolvable to said class, method, and package programming resources.

14. An article of manufacture comprising:

a computer usable medium having computer readable program code embodied therein configured to evaluate compatibility between an operating platform and an application using a computer system comprising:

computer readable program code configured to cause a computer to generate a programming resource tree using at least one specification that identifies programming resources of said operating platform;

computer readable program code configured to cause a computer to identify programming resources of said application and a dependency contained in said application;

computer readable program code configured to cause a computer to determine whether said dependency in said application is resolvable to one of said programming resources of said at least one specification and said application.

15. The article of manufacture of claim 14 wherein said at least one specification comprises a first specification and a second specification said computer readable program code configured to cause a computer to generate a programming resource tree further comprises:

computer readable program code configured to cause a computer to parse said first specification to generate a programming resource tree having references contained in said first specification;

computer readable program code configured to cause a computer to modify said programming resource tree to include references contained in said second specification.

16. The article of manufacture of claim 15 wherein said computer readable program code configured to cause a computer to modify said programming resource tree to include references contained in said second specification further comprises:

computer readable program code configured to cause a computer to determine whether a programming resource tree entry exists that corresponds to one of said references contained in said second specification;

computer readable program code configured to cause a computer to modify said programming resource tree entry to reflect a status of said one of said references contained in said second specification, if said programming resource tree entry exists and said status of said programming resource tree entry does not correspond to said status of said one of said references contained in said second specification;

computer readable program code configured to cause a computer to add an entry in said programming resource tree that corresponds to said one of said references contained in said second specification, if said programming resource tree entry does not exist.

17. The article of manufacture of claim 16 wherein said computer readable program code configured to cause a computer to modify said programming resource tree entry to reflect a status of said one of said references contained in said second specification further comprises:

computer readable program code configured to cause a computer to remove child references of said programming resource tree entry in said programming resource tree when a status of said one of said references contained in said second specification is unsupported.

18. The article of manufacture of claim 16 wherein said computer readable program code configured to cause a computer to modify said programming resource tree entry to reflect a status of said one of said references contained in said second specification futher comprises:

computer readable program code configured to cause a computer to modify said programming resource tree entry to reflect universal resource locator (URL) and comment attributes of said one of said references contained in said second specification; and computer readable program code configured to cause a computer to modify a spec attribute of said programming resource tree entry to indicate said second specification.

19. The article of manufacture of claim 14 wherein said computer readable program code configured to cause a computer to identify programming resources of said application further comprises:

computer readable program code configured to cause a computer to generate a dependency tree of said application, said dependency tree identifying said application's programming resources.

20. The article of manufacture of claim 14 wherein said computer readable program code configured to cause a computer to determine further comprises:

computer readable program code configured to cause a computer to determine whether a programming resource of said application can resolve said dependency reference;

computer readable program code configured to cause a computer to determine whether a programming resource of said at least one specification can resolve said dependency reference, if none of said programming resources of said application can resolve said dependency reference.

21. The article of manufacture of claim 20 wherein said computer readable program code configured to cause a computer to determine whether a programming resource of said at least one specification can resolve said dependency reference further comprises:

computer readable program code configured to cause a computer to mark said dependency as resolved, if said one of said programming resources of said at least one specification corresponds to said dependency and has a status of required;

computer readable program code configured to cause a computer to mark said dependency as unresolved if said one of said programming resources of said at least one specification corresponds to said dependency and does not have a status of required.

22. A computer data signal embodied in a carrier wave and representing sequences of instructions which, when executed by a processor, cause said processor to evaluate compatibility between an operating platform and an application using a computer system by performing the steps of:

generating a programming resource tree using at least one specification that identifies programming resources of said operating platform;

identifying programming resources of said application and a dependency contained in said application;

determining whether said dependency in said application is resolvable to one of said programming resources of said at least one specification and said application.

23. The computer data signal of claim 22 wherein said at least one specification comprises a first specification and a second specification said step of generating a programming resource tree further comprises the steps of:

parsing said first specification to generate a programming resource tree having references contained in said first specification;

modifying said programming resource tree to include references contained in said second specification.

24. The computer data signal of claim 23 wherein said step of modifying said programming resource tree to include references contained in said second specification further comprises the steps of:

determining whether a programming resource tree entry exists that corresponds to one of said references contained in said second specification;

modifying said programming resource tree entry to reflect a status of said one of said references contained in said second specification, if said programming resource tree entry exists and said status of said programming resource tree entry does not correspond to said status of said one of said references contained in said second specification;

adding an entry in said programming resource tree that corresponds to said one of said references contained in said second specification, if said programming resource tree entry does not exist.

25. The computer data signal of claim 24 wherein said step of modifying said programming resource tree entry to reflect a status of said one of said references contained in said second specification further comprises the step of:

removing any child references of said programming resource tree entry in said programming resource tree when a status of said one of said references contained in said second specification is unsupported.

26. The computer data signal of claim 24 wherein said step of modifying said programming resource tree entry to reflect a status of said one of said references contained in said second specification futher comprises the steps of:

modifying said programming resource tree entry to reflect universal resource locator (URL) and comment attributes of said one of said references contained in said second specification; and modifying a spec attribute of said programming resource tree entry to indicate said second specification.

27. The computer data signal of claim 22 wherein said step of identifying programming resources of said application further comprises the step of:

generating a dependency tree of said application, said dependency tree identifying said application's programming resources.

28. The computer data signal of claim 22 wherein said step of determining further comprises the steps of:

determining whether a programming resource of said application can resolve said dependency reference;

determining whether a programming resource of said at least one specification can resolve said dependency reference, if none of said programming resources of said application can resolve said dependency reference.

29. The computer data signal of claim 28 wherein said step of determining whether a programming resource of said at least one specification can resolve said dependency reference further comprises the steps of:

marking said dependency as resolved, if said one of said programming resources of said at least one specification corresponds to said dependency and has a status of required;

marking said dependency as unresolved if said one of said programming resources of said at least one specification corresponds to said dependency and does not have a status of required.

30. A method of evaluating compatibility between an operating platform and an application using a computer system comprising:

generating a programming resource tree using at least one specification that identifies programming resources of said operating platform;

identifying programming resources of said application and a dependency contained in said application;

assigning said dependency a first status if at least one of said programming resources of said application corresponds to said dependency;

assigning said dependency said first status if at least one of said programming resources of said at least one specification corresponds to said dependency and has a compliance status of required by said operating platform; and, wherein said first status comprises marking said dependency as resolved.

31. The method of claim 30 further comprising marking said dependency as unresolved if it is not assigned said first status.

32. The method of claim 30 wherein said programming resource of said operating platform has said compliance status of optional.

33. The method of claim 32 wherein said compliance status of optional generates a non-conformance warning message.

34. The method of claim 30 wherein said programming resource of said operating platform has said compliance status of modified if said programming resource of said operating platform has been changed.

35. The method of claim 34 wherein said compliance status of modified generates a non-conformance error message.

36. The method of claim 30 wherein said programming resource of said operating platform has said compliance status of unsupported.

37. The method of claim 36 wherein said compliance status of unsupported generates a non-conformance error message.

* * * * *